US010100687B2

(12) United States Patent
Gläser

(10) Patent No.: US 10,100,687 B2
(45) Date of Patent: Oct. 16, 2018

(54) VALVE ARRANGEMENT

(71) Applicant: Mesa Parts GmbH, Lenzkirch (DE)

(72) Inventor: Stefan Gläser, Bottighofen (CH)

(73) Assignee: MESA PARTS GMBH, Lenzkirch (DE)

( * ) Notice: Subject to any disclaimer, the term of this patent is extended or adjusted under 35 U.S.C. 154(b) by 132 days.

(21) Appl. No.: 15/071,308

(22) Filed: Mar. 16, 2016

(65) Prior Publication Data

US 2016/0281552 A1     Sep. 29, 2016

(30) Foreign Application Priority Data

Mar. 27, 2015   (DE) .................. 10 2015 104 799

(51) Int. Cl.
| | |
|---|---|
| *F01L 9/04* | (2006.01) |
| *F02M 21/02* | (2006.01) |
| *F16K 27/00* | (2006.01) |
| *F16K 31/06* | (2006.01) |
| *F01L 3/00* | (2006.01) |

(52) U.S. Cl.
CPC ........... *F01L 9/04* (2013.01); *F02M 21/0254* (2013.01); *F02M 21/0263* (2013.01); *F02M 21/0278* (2013.01); *F16K 27/003* (2013.01); *F16K 31/06* (2013.01); *F16K 31/0658* (2013.01); *F16K 31/0679* (2013.01); *F01L 2003/258* (2013.01); *F01L 2009/0403* (2013.01); *F01L 2009/0434* (2013.01); *F01L 2009/0461* (2013.01); *F01L 2820/01* (2013.01); *Y02T 10/32* (2013.01)

(58) Field of Classification Search
CPC ..... F02M 21/0254; F01L 9/04; F16K 27/003; F16K 31/0658
See application file for complete search history.

(56) References Cited

U.S. PATENT DOCUMENTS

| 4,545,345 A | 10/1985 | Pagdin | |
|---|---|---|---|
| 4,617,904 A | 10/1986 | Pagdin | |
| 5,378,114 A * | 1/1995 | Howe | ............ F02B 43/00 123/450 |

FOREIGN PATENT DOCUMENTS

| EP | 1 860 314 A2 | 11/2007 |
|---|---|---|
| EP | 1 888 956 B1 | 12/2009 |

OTHER PUBLICATIONS

European search report for related application 16 159 285.2, dated Sep. 13, 2016.
Chinese office action for related application 2016 1018 2506.8, dated Jan. 3, 2018.

* cited by examiner

*Primary Examiner* — Kevin A Lathers
(74) *Attorney, Agent, or Firm* — William Gray Mitchell

(57) ABSTRACT

A valve arrangement for the measured supply of gaseous fuel in internal combustion engines with a plurality of electromagnetically operable control valves of an individual cross-section, with the control valves being embodied as seat valves, allowing the allocation of the valve arrangement to an internal combustion engine, and the valve arrangement comprising a nominal cross-section for providing a predetermined volume flow, with the seat valves being designed such that a sum of the individual cross-sections is at least equivalent to the nominal cross-section, an effective cross-section due to a valve stroke of all seat valves is equivalent to the nominal cross-section, and the effective cross-section is smaller or equivalent to the sum of individual cross-sections.

14 Claims, 4 Drawing Sheets

Fig. 7
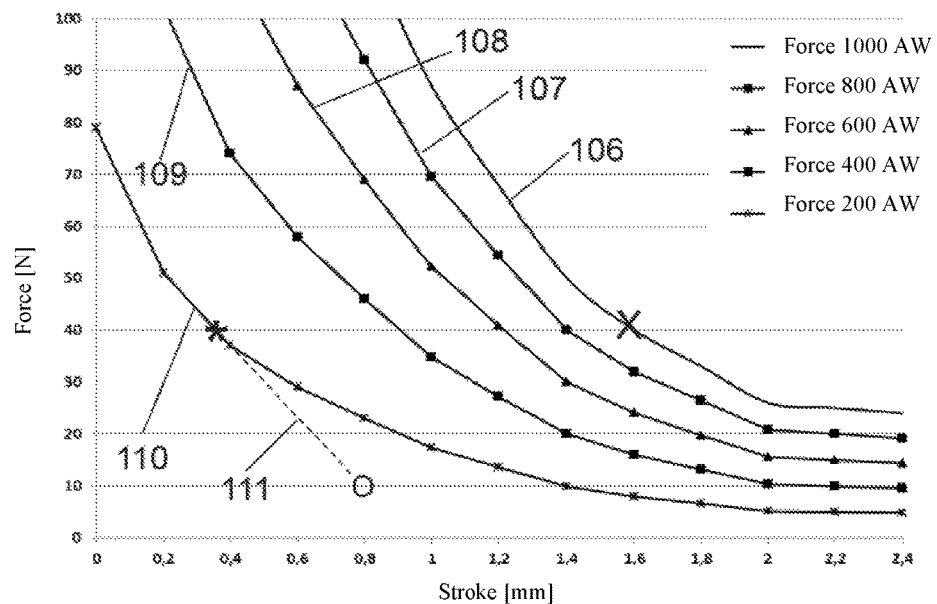
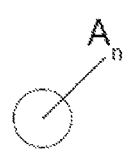
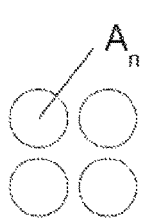
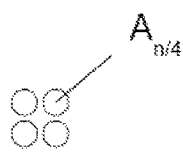
Fig. 8A   Fig. 8B   Fig. 8C

VALVE ARRANGEMENT

CROSS REFERENCE TO RELATED APPLICATIONS

This patent application claims priority to German Patent Application 10 2015 104 799.3, filed on Mar. 27, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a valve arrangement.

Background of the Invention

Various valve arrangements are known from prior art for the measured feeding of a gaseous fuel into internal combustion engines comprising a plurality of electromagnetically operable control valves of an individual cross-section, with the control valves being embodied as seat valves, it being possible to allocate the valve arrangement to a combustion chamber, and the valve arrangements showing a nominal cross-section in order to provide a predetermined volume flow. Such valve arrangements are disclosed for example in WO 2007/036 382 A1 and U.S. Pat. No. 4,545, 345 or EP 1 888 956 B1.

In prior art, for so-called large gas engines, i.e. particularly for gas engines with a power of preferably at least 500 kW, plate valves are used as so-called injection valves for the gaseous fuel.

Such plate valves comprise a gas inlet and a gas outlet, with a separating plate with multiple perforations being arranged between the inlet and the outlet as well as a plate-shaped sealing element adjusted thereto for closing the apertures in the separating plate. The plate valve designed in this fashion can be operated via an electromagnetic drive, so that the sealing element is either lifted off the separating plate and thus releases the passages or rests thereon and closes the passages in a sealing fashion. This design is selected in prior art, because previously only this way the large nominal cross-sections required, showing up to 1,500 mm$^2$, could be achieved.

The plate valves known from prior art show various disadvantages, which are briefly described in the following.

On the one hand, such plate valves require a highly precise positioning of the sealing element, because only in an absolutely parallel alignment of the sealing element and the separating plate an even opening of the valve is ensured and sufficient sealing behavior can be achieved with tolerable leakage.

Furthermore, it is considered disadvantageous that the plate valves known from prior art require a relatively large constructive space, because the minimally required base area is determined by the size of the separating and/or sealing plate used. Due to their design, such plate valves are relatively sensitive to particles introduced via the gas flow, because such particles can precipitate in the proximity of the separating plate and thus overall compromise the function of the plate valve. Any redundancy is not given.

The objective of the present invention is to provide a valve arrangement, which is free of the disadvantages known from prior art, shows increased reliability, and can be used in a more flexible fashion. This objective is attained in a valve arrangement showing the features of claim 1. Advantageous further developments are disclosed in the dependent claims.

BRIEF SUMMARY OF THE INVENTION

In a preferred embodiment, a valve arrangement for the measured feeding of a gaseous fuel into internal combustion engines comprising a plurality of electromagnetically operable control valves showing an individual cross-section, with the control valves being embodied as seat valves, it is possible to allocate the valve arrangement to a combustion chamber, and the valve arrangement comprising a nominal cross-section for providing a predetermined volume flow, wherein the seat valves are embodied such that a sum of the individual cross-sections, is at least equivalent to the nominal cross-section, an effective cross-section based on a valve stroke of all seat valves is equivalent to the nominal cross-section, and the effective cross-section is lower or equivalent to the sum of the individual cross-sections.

In another preferred embodiment, the valve arrangement as described herein, wherein the control valves each show a separate electromagnetic drive.

In another preferred embodiment, the valve arrangement as described herein, wherein the control valves can be addressed jointly or separately.

In another preferred embodiment, the valve arrangement as described herein, wherein the valve arrangement comprises at least two, preferably at least four control valves.

In another preferred embodiment, the valve arrangement as described herein, wherein the control valves are arranged in a common housing, with the housing showing an input line and an output line for the gaseous fuel.

In another preferred embodiment, the valve arrangement as described herein, wherein the control valves have an identical design.

In another preferred embodiment, the valve arrangement as described herein, wherein the control valves have a machined design.

In another preferred embodiment, the valve arrangement as described herein, wherein a maximum valve stroke amounts to less than 5 mm.

In another preferred embodiment, the valve arrangement as described herein, showing a nominal cross-section amounting to 700 mm$^2$ and 6 control valves, with one valve stroke being 1.5 mm.

In another preferred embodiment, the use of the valve arrangement as described herein in a large gas engine with a capacity of at least 500 kW.

In another preferred embodiment, the valve arrangement use in a large gas engine as described herein, for maritime or stationary applications.

In another preferred embodiment, a modular system for the design of valve arrangements to form nominal cross-sections from 50 mm$^2$ to 1500 mm$^2$ with a plurality of electromagnetically operable control valves, embodied as identical seat valves and arranged in a common housing, each showing an individual cross-section, wherein: the individual cross-section is smaller or equivalent to the nominal cross-section, a number of control valves used is greater or equivalent to the nominal cross-section minimally required for the volume flow divided by the individual cross-section, a valve stroke is adjusted to the number of control valves such that an effective cross-section at a valve stroke is equivalent to the nominal cross-section, and the number of control valves used is selected such that a total stroke work of all control valves is at least halved in reference to an individual valve, preferably divided in fourths.

BRIEF DESCRIPTION OF THE DRAWINGS

FIG. 7 is a line drawing evidencing shows a family of characteristics of an electromagnetic drive as well as the operating points of different exemplary embodiments.

FIGS. 8A-8C are line drawings evidencing schematic diagrams in a top view, in FIG. 8A an individual valve with a first individual cross-section, in FIG. 8B four seat valves with an individual cross-section of the valve of FIG. 8A, and in FIG. 8C four seat valves with a second individual cross-section, equivalent to one fourth of the first individual cross-section.

DETAILED DESCRIPTION OF THE INVENTION

Figure 1:
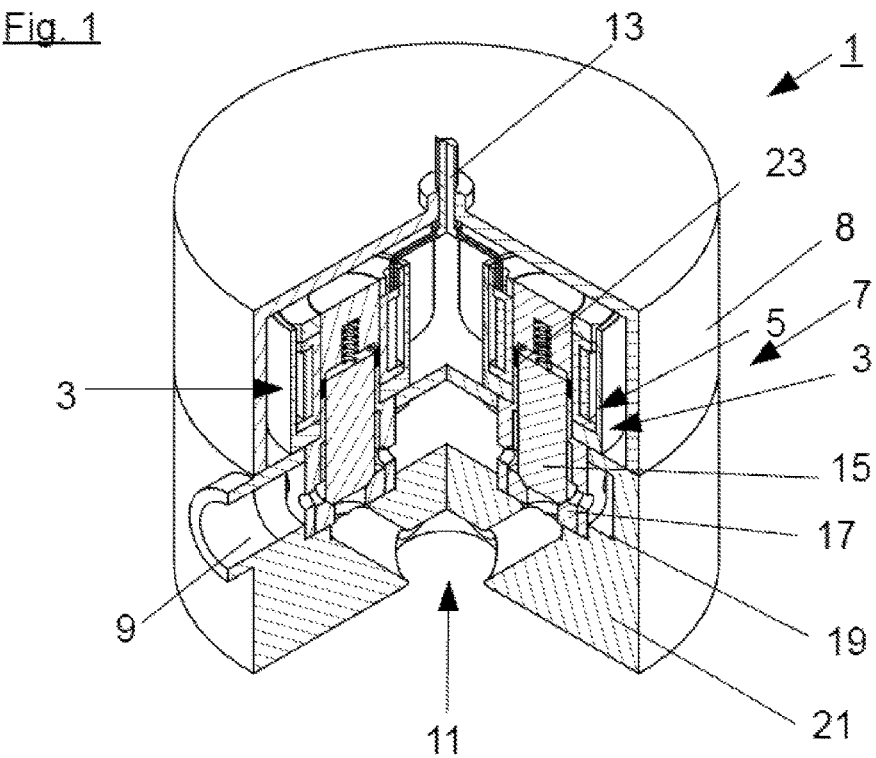
FIG. 1 is a line drawing evidencing perspective view of a cross-sectional detail of a first exemplary embodiment of a valve arrangement with four seat valves.

The use of a valve arrangement according to the invention is the objective of claim 10. A respective modular system for designing valve arrangements according to the invention is the objective of claim 11.

A valve arrangement according to the invention for the measured feeding of gaseous fuels into internal combustion engines with a plurality of electromagnetically operable control valves showing a single cross-section, with the control valves being embodied as seat valves, it being possible to allocate the valve arrangement to a combustion chamber of the internal combustion engine, and the valve arrangement showing a nominal cross-section to provide a predetermined volume flow, is characterized in that the seat valves are designed such that a sum of the individual cross-sections is at least equivalent to the nominal cross-section, an effective cross-section, due to the valve stroke, is equivalent to the nominal cross-section, and the effective cross-section is lower or equivalent to the total of the individual cross-section.

The present invention is therefore based on the fundamental acknowledgment that by using a plurality of electromagnetically operable control valves, embodied as seat valves, a flexible and simultaneously robust valve arrangement can be provided, with the fact that the seat valves being so designed that a sum of the individual cross-sections is at least equivalent to the nominal cross-section, here an arrangement is provided, which shows during a minimal valve stroke in any case the nominal cross-section required for providing the predetermined volume flow. Due to the fact that a sum of these individual cross-sections can be greater than the nominal cross-section required it is possible with the valve stroke of all seat valves, which is lower than a maximum valve stroke, to release an effective cross-section which is equivalent to the nominal cross-section, yet lower or equivalent to the sum of the individual cross-sections.

This way it is achieved that, by a multiplication of the seat valves used, a reduction of the required valve stroke is possible to release the nominal cross-section. By a reduction of the individual cross-sections compared to an individual valve additionally an optimization of the position of the operating point of the individual seat valves can be achieved in the force-distance graph, so that overall a reduced stroke work can be yielded compared to an individual valve. By a reduced stroke, further reduced cycle times can be achieved.

Advantageously the switching valves each show a separate electromagnetic drive, so that both the valves as well as the drives are designed redundantly in reference to each other.

An optimal control of the valve arrangement can be achieved when the control valves can be addressed jointly or separately, with a separate addressing of the control valves representing a particularly skillful embodiment. In case of a separate addressing it is possible, that for reducing the volume flow provided by the valve arrangement only individual valves or a group of valves are opened, so that an appropriately reduced effective cross-section is released.

The present invention shows its effect already in a valve arrangement with at least two control valves, with the positive effects being even amplified in valve arrangements with four control valves or for example six control valves.

A particularly compact arrangement can be achieved when the control valves are arranged in a common housing, with the housing showing a single input line and a single output line for the gaseous fuel. This way, a valve arrangement can be provided, which appears to the user outside that it acts as a single valve, however by the use of a plurality of control valves inside the housing it shows a considerably superior operation.

Technology allows a plurality of advantages during the production of the present valve arrangement to be realized when the control valves show an identical design. By the use of identical parts and the multiplication of the number of valves in a valve arrangement the number of individual parts can be increased in a targeted fashion and thus the production costs can be reduced.

With regards to the production as well as leakage it is advantageous when the control valves show an essentially machined design. By the use of machined parts for the design of the individual control valves of the valve arrangement, using simple production processes, components of high quality can be produced, particularly showing low tolerances, and thus considerably reduced leakage of the valve arrangement can be ensured compared to, for example, plate valves known from prior art.

In order to ensure low cycle times and simultaneously low wear and tear of the individual control valves, the maximum valve stroke should amount to less than 5 mm, preferably less than 3 mm. By a low valve stroke, on the one hand low cycle times and on the other hand by the shorter acceleration path of a sealing element resulting here when closing the valve, reduced wear effects can also be achieved at the sealing element and the valve seat.

A preferred valve arrangement shows a nominal cross-section of approx. 700 mm², with the valve arrangement being assembled from six control valves and a valve stroke showing approximately 1.5 mm.

A valve arrangement according to the invention is preferably used in a large gas motor, with this large gas motor preferably being designed for maritime and/or stationary applications, generating a power of preferably at least 500 kW.

The present invention further relates to a modular system for the construction of valve arrangements to generate nominal cross-sections from 50 to 1,500 mm² with a plurality of electromagnetically operable control valves, arranged in a common housing and identically embodied seat valves, each of which showing an individual cross-section and being characterized in that the individual cross-section of the control valves is smaller or identical to the nominal cross-section, a number of control valves used is greater or equivalent to a nominal cross-section minimally necessary for the volume flow divided by the individual cross-section, a valve stroke adjusted to the number of control valves such that an effective cross-section in a valve stroke is equivalent to the nominal cross-section, and the number of control valves used is selected such that a total stroke work of all control valves is at least halved in reference to an individual valve, preferably cut into fourths.

Within the scope of the present invention, the nominal cross-section shall be understood as the cross-section for ensuring a predetermined volume flow. An individual cross-section is understood as a maximally possible cross-section of a valve when it is completely open. The effective cross-section represents the sum of all cross-sections in the present invention released at a stroke of all valves of the valve arrangement. Control valves in the sense of the present application are valves with two settings, with the valves preferably being equipped as normally closed valves. A stroke of the control valves is limited according to the present invention such that a cross-section released during a valve stroke is smaller or equivalent to the individual cross-section of the control valve, particularly the stroke of the valves is selected such that in a valve arrangement the sum of all released cross-sections is equivalent to the effective cross-section. A maximum valve stroke is the valve stroke required for a valve to release the individual cross-section, thus the maximally possible cross-section. In particular, the valve stroke can be limited for example by a mechanic stop to a valve below the maximum valve stroke and thus limit the released cross-section.

DETAILED DESCRIPTION OF THE FIGURES

FIG. 1 shows a perspective illustration of a detail of a cross-section through a first exemplary embodiment of a valve arrangement 1 with four control valves 3 embodied as seat valves. The valve arrangement 1 shows a housing 7, which essentially is formed from a base plate 21 as well as a lid 8. A pressure chamber 19 is embodied in the base plate 21, connected to an input line 9 for a gaseous fuel. The control valves 3 are arranged in bores of the base plate 21 such that they can separate the pressure chamber 19 from an outlet 11, also formed in the base plate 21, in a sealing fashion.

In the present exemplary embodiment the four control valves 3 can be addressed via a common electric supply line. The individual control valves 3 show for their operation an electromagnetic drive 5, essentially comprising a magnetic coil arranged on a coil support and arranged suitably to act upon an anchor of the control valve 3. The control valves 3 shown in FIG. 1 are normally closed control valves 3 and here they are spring-loaded with a pressure spring 23 in the closing direction. The control valves 3 are further embodied as so-called conical seat valves, i.e. a seat 17 of the control valves 3 embodied between the pressure chamber 19 and the outlet line 11 as well as the anchor 15 cooperating with the seat 17 show a conical contour at their contact area.

Figure 2:
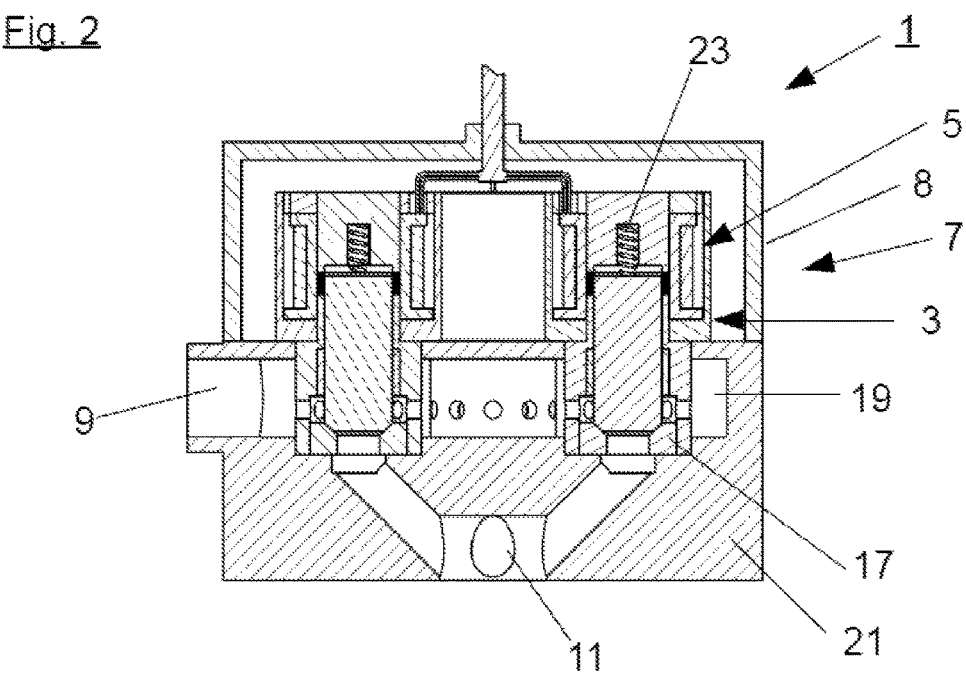
FIG. 2 is a line drawing evidencing shows a cross-sectional illustration of the valve arrangement of FIG. 1.

The exemplary embodiment of FIG. 1 is once more shown in FIG. 2 in a cross-section. In this cross-section, clearly the arrangement of the control valve 3 is discernible in the base plate 21, with it being possible to connect the control valves 3 into the base plate 21, for example screwed therein, compressed therein, welded therein, soldered therein, or otherwise fastened. Additionally, the seat of the base plate 21 can be fastened and the control valves 3 can be fastened, axially allocated and aligned in the lid 8.

By the arrangement of the control valve 3 in a common housing 7, the valve arrangement 1 is embodied as a separately handled unit, which can be arranged, for example via suitable fastening means, for example a flange arranged at the base plate 21, a suitable external thread, or other suitable fastening means, directly upstream from a combustion chamber, for example a cylinder of the internal combustion engine.

In the exemplary embodiment shown in FIGS. 1 and 2 the four control valves are arranged in a top view respectively offset by 90° such that overall a cylindrical design of the valve arrangement 1 results. However, alternative arrangements are also possible, for example serial ones.

Figure 3:
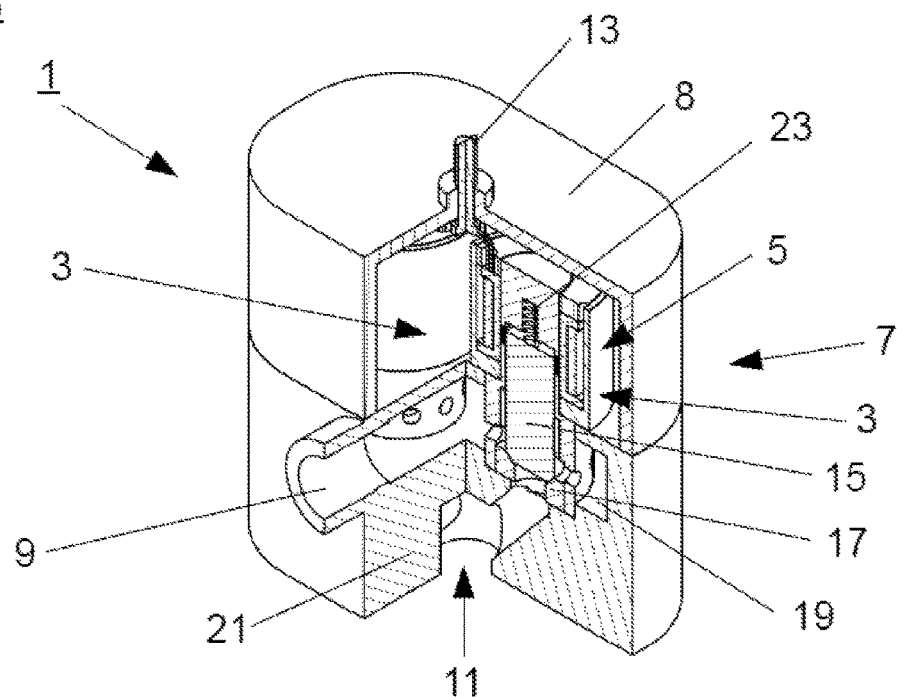
FIG. 3 is a line drawing evidencing shows a perspective detail of a cross-section of a second exemplary embodiment of a valve arrangement with two seat valves.

FIG. 3 shows a second exemplary embodiment of a valve arrangement 1, with two control valves 3 being arranged in a common housing 7 in the exemplary embodiment shown in FIG. 3. Due to the fact that the design of the valve arrangement 1 as well as the individual control valves 3 are not distinguished from the components described in FIGS. 1 and 2, reference is made to the previous description.

Figure 4:
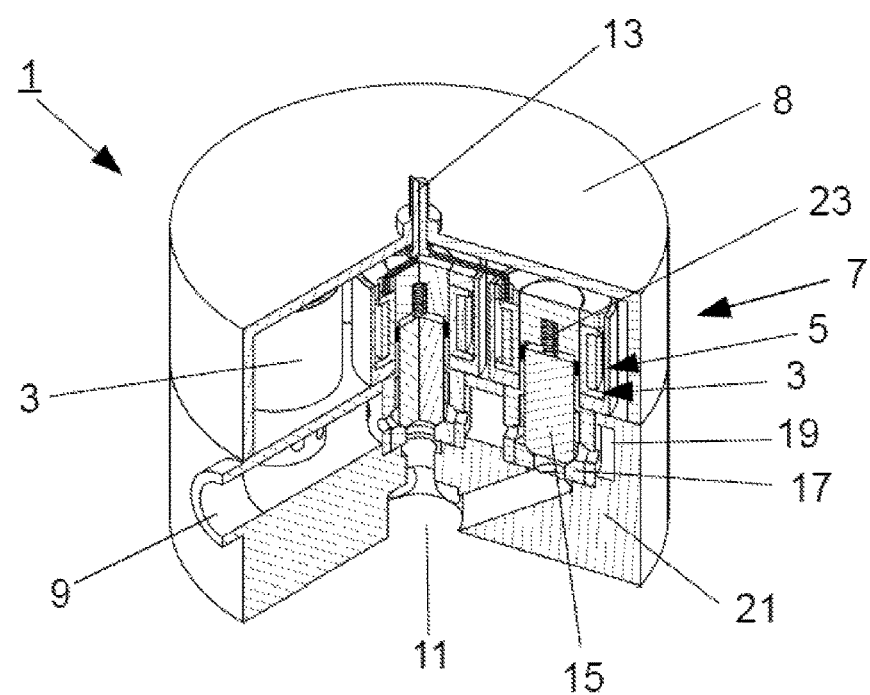
FIG. 4 is a line drawing evidencing shows a perspective detail of a cross-section of a third exemplary embodiment of a valve arrangement with six seat valves.

FIG. 4 shows a third exemplary embodiment of a valve arrangement 1, in which a total of six control valves 3 are arranged in a common housing 7. In a top view, a first control valve 3 is arranged centrally, with the remaining five control valves 3 being arranged on a circular line around said first control valve 3. This represents another optional arrangement.

In order to avoid unnecessary repetitions here too, reference is made to the description of the valve arrangement of FIGS. 1 and 2 as well as its components.

In order to illustrate the functionality and effects that can be yielded with the valve arrangements 1 according to the present application, FIG. 8 shows in a schematic illustration three different valve arrangements 1 in a top view, with only the individual cross-sections $A_n$ of the control valves 3 being shown and for simplification it being assumed that the respective individual cross-section $A_n$ for calculating the stroke work $W_h$ required for the valve opening also being equivalent to the pressure-exposed area of the valve.

FIG. 8a shows an individual control valve 3 with an individual cross-section $A_n$. FIG. 8b shows four control valves 3, with each of the control valves 3 showing an individual cross-section $A_n$ as the valve of FIG. 8a. FIG. 8c shows four control valves 3, with a total of the four individual cross-sections being equivalent to the cross-section of the control valve 3 shown in FIG. 8a, thus each of the control valves showing a cross-section $A_n/4$.

Symbols are shown under the respective valve arrangements in FIGS. 8a to c, by which the individual arrangements are drawn in the subsequently described characteristics.

Figure 5:
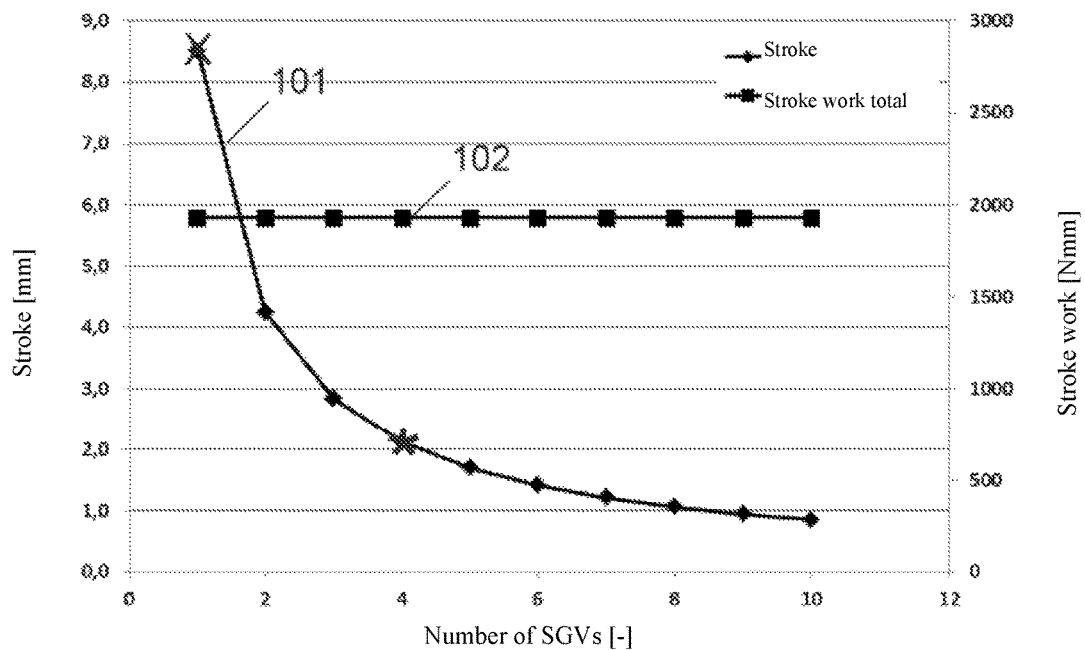
FIG. 5 is a line drawing evidencing shows in a characteristic the function of the valve stroke from the number of seat valves in case of identical individual cross-sections and a given nominal cross-section.

FIG. 5 shows with a given nominal cross-section $A_{Nenn}$ the function of the required valve stroke h to achieve an effective cross-section $A_{eff}$, which is equivalent to the nominal cross-section $A_{Nenn}$ as a function of a number of control valves with identical individual cross-sections $A_n$. The characteristic 101 shows here a valve stroke h, with the characteristic 102 being shown for the entire number of control valves used for the required stroke work $W_h$.

In the diagram shown in FIG. 5, on the abscissa the number of the control valves used and on the ordinate, on the one hand the valve stroke h (left ordinate) resulting in one exemplary embodiment as well as the here resulting stroke work $W_h$ (right ordinate), are shown.

In order to achieve, in case of a predetermined pressure and a nominal cross-section $A_{Nenn}$, which in the present example shall be equivalent to the individual cross-section $A_n$ of a single control valve 3, an effective cross-section $A_{eff}$, an individual control valve 3, similar to the one shown for example in FIG. 8a, must be maximally opened, i.e. such that the individual cross-section $A_n$ is completely released. For the present analysis this is equivalent to a valve stroke h of 8.25 mm.

If instead of a single control valve 3, here four equally sized control valves 3 are used respectively with an individual cross-section $A_n$ of the individual control valve 3, here the valve stroke h required to yield the effective cross-section $A_{eff}$ equivalent to the nominal cross-section $A_{Nenn}$ reduces to one fourth, which in the present exemplary embodiment is approximately equivalent to 2.06 mm.

The function of the valve stroke h of the number of control valves 3 used is reflected in the characteristic 101. It is discernible from this characteristic that the reduction of the valve stroke h shows a lower effect with an increasing number of control valves 3 used, with the overall necessary stroke work Wh for opening the valve arrangement 1 remaining constant, as discernible from the characteristic 102.

This results from the fact that the stroke work $W_h$, calculated from the force required for opening the valve arrangement multiplied with the necessary valve stroke h required for the effective cross-section $A_{eff}$ remains steady in case of a four-fold multiplication of the pressurized valve area with simultaneously cutting in fourth the valve stroke h required.

Figure 6:
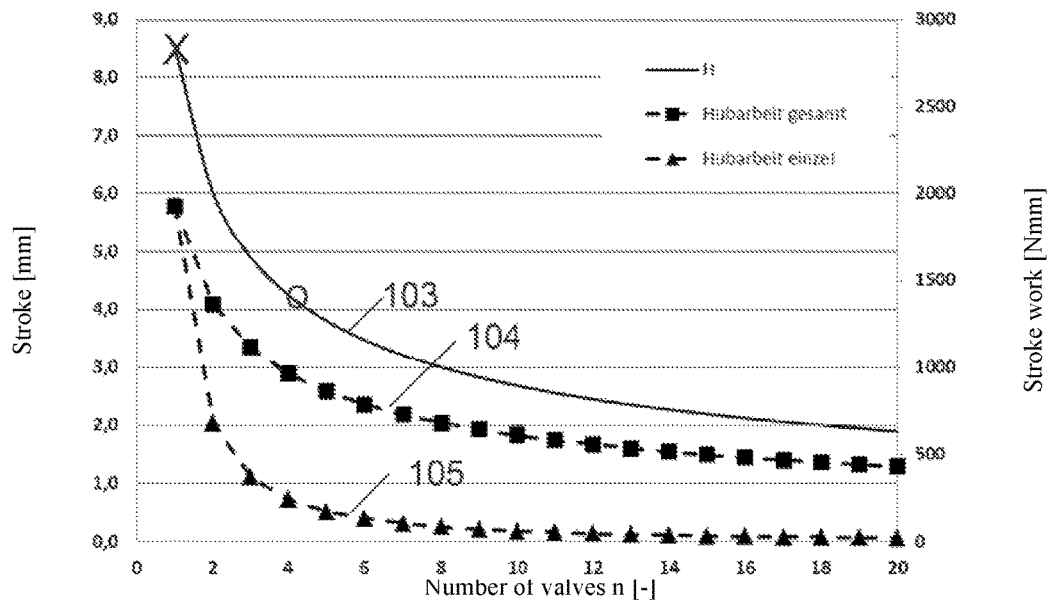
FIG. 6 is a line drawing evidencing shows the function of the stroke of the number of seat valves in a constant overall cross-section, the required stroke work for a seat valve, as well as the total stroke work.

FIG. 6 shows in a diagram the function of the valve stroke h—again conditional to a constant nominal cross-section $A_{Nenn}$ of the valve arrangement 1—in reference to the number of control valves 3 used, with the sum of the individual cross-sections $A_n$ of the control valves 3 used being equivalent to the individual cross-section $A_n$ of the individual control valve 3 of FIG. 8a and/or the nominal cross-section $A_{Nenn}$. In the diagram in FIG. 6 the abscissa shows the number of control valves 3 used, with the valve stroke h being displayed at the left ordinate and the required stroke work $W_h$ at the right ordinate. Accordingly, the characteristic 103 shows the valve stroke h, characteristic 104 the overall required stroke work $W_{ges}$ for all control valves 3 of the valve arrangement 1, and characteristic 105 the required stroke work $W_h$ for opening an individual control valve 3.

On the stroke characteristic 103 in FIG. 6 the situations illustrated in FIGS. 8a and 8c are displayed, i.e. the stroke when using a single control valve 3 with an individual cross-section $A_n$ as well as four control valves 3, with their individual cross-sections being equivalent in total to the individual cross-section $A_n$ of the individual valve As discernible from the characteristic 103, in such an approach the required valve stroke h to yield an effective cross-section $A_{eff}$ equivalent to the nominal cross-section $A_{Nenn}$, can only be halved compared to the one of FIG. 5. However, simultaneously the overall required stroke work $W_{ges}$ can also be halved. The reduction of the stroke work $W_h$ results here from the fact that with the same pressurized area of the valve arrangement 1 and a simultaneous halving of the valve stroke h, here the respectively required stroke work $W_h$ is also halved.

The reduction of the valve stroke h to half in case of a four-fold multiplication of the number of valves with an unchanged overall cross-sectional area results from the fact that a valve diameter acts squaring when calculating the cross-sectional area, in a calculation of the cross-sectional area released during a valve stroke however it acts only in a linear fashion. Consequently, in an overall constant effective cross-sectional area $A_{eff}$ and a four-fold multiplication of the number of valves both the required valve stroke h as well as the required stroke work can be halved.

FIG. 7 shows a family of characteristics of an electromagnetic drive, with the three situations of FIG. 8 being displayed in the family of characteristics. The abscissa shows in the diagram illustrated in FIG. 7 the valve stroke h, with the force that can be generated being displayed in Newton on the ordinate in the respective operating point. It shows for example the stroke-force characteristic for magnets with the following magnetomotive force: Characteristic 106 with 1000 AW, characteristic 107 with 800 AW, characteristic 108 with 800 AW, characteristic 109 with 400 AW, and characteristic 110 with 200 AW. By a variation of the individual cross-section $A_n$ with a given nominal cross-section $A_{Nenn}$ a displacement of the operating point of the individual control valves 3 can be achieved on the characteristic marked 111.

As discernible from FIG. 7, by multiplying the control valves 3 used in a valve arrangement 1 as well as a suitable adjustment of the individual cross-section $A_n$ of the control valves 3 an adjustment can occur of the operating point of the electromagnetic drive.

Overall, this way according to the present application not only an optimization can occur with regards to the mechanic features (leakage, redundancy, service life) but also with regards to electric features. Overall, by the use of identical parts, and further by the increase of the quantities of these identical parts a significant cost reduction can be achieved during the production of the valve arrangement.

LIST OF REFERENCE NUMBERS

1 Valve arrangement
3 Control valves
5 Electromagnetic drive
7 Housing
8 Cover
9 Input line
11 Output line
13 Electric input line 15 Anchor
17 Seat
19 Pressure chamber
21 Base plate
23 Pressure spring
101-105 Characteristics
111 Characteristic
$A_n$ Individual cross-section
$A_{Nenn}$ Nominal cross-section
$A_{eff}$ Effective cross-section
h Valve stroke
$W_h$ Stroke work
$W_{ges}$ Total stroke work The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A valve arrangement for the measured feeding of a gaseous fuel into internal combustion engines comprising a plurality of electromagnetically operable control valves showing an individual cross-section, with the control valves being embodied as seat valves, it is possible to allocate the valve arrangement to a combustion chamber, and the valve arrangement comprising a nominal cross-section for providing a predetermined volume flow, wherein the seat valves are embodied such that
    a sum of the individual cross-sections, is higher than the nominal cross-section,
    an effective cross-section based on a valve stroke of all seat valves is equivalent to the nominal cross-section, and
    the effective cross-section is lower than the sum of the individual cross-sections.

2. The valve arrangement of claim 1, wherein the control valves each show a separate electromagnetic drive.

3. The valve arrangement of claim 2, wherein the control valves can be addressed jointly or separately.

4. The valve arrangement of claim 1, wherein the valve arrangement comprises at least two control valves.

5. The valve arrangement of claim 1, wherein the control valves are arranged in a common housing, with the housing showing an input line and an output line for the gaseous fuel.

6. The valve arrangement of claim 1, wherein the control valves have an identical design.

7. The valve arrangement of claim 1, wherein the control valves have a machined design.

8. The valve arrangement of claim 1, wherein a maximum valve stroke amounts to less than 5 mm.

9. The valve arrangement of claim 1, showing a nominal cross-section amounting to 700 mm² and 6 control valves, with one valve stroke being 1.5 mm.

10. A method of use of the valve arrangement of claim 1, wherein said valve arrangement is applied to a large gas engine with a capacity of at least 500 kW.

11. The valve arrangement use of claim 10, for maritime or stationary applications.

12. The valve arrangement of claim 1, wherein the valve arrangement comprises at least four control valves.

13. A modular system for the design of valve arrangements to form nominal cross-sections from 50 mm² to 1500 mm² with a plurality of electromagnetically operable control valves, embodied as identical seat valves and arranged in a common housing, each showing an individual cross-section, wherein
    the individual cross-section is smaller than the nominal cross-section,
    a number of control valves used is greater than the nominal cross-section minimally required for the volume flow divided by the individual cross-section,
    a valve stroke is adjusted to the number of control valves such that an effective cross-section at a valve stroke is equivalent to the nominal cross-section, and
    the number of control valves used is selected such that a total stroke work of all control valves is at least halved in reference to an individual valve.

14. The modular system of claim 13, wherein the number of control valves used is selected such that a total stroke work of all control valves is divided in fourths in reference to an individual valve.

* * * * *